United States Patent Office 3,573,075
Patented Mar. 30, 1971

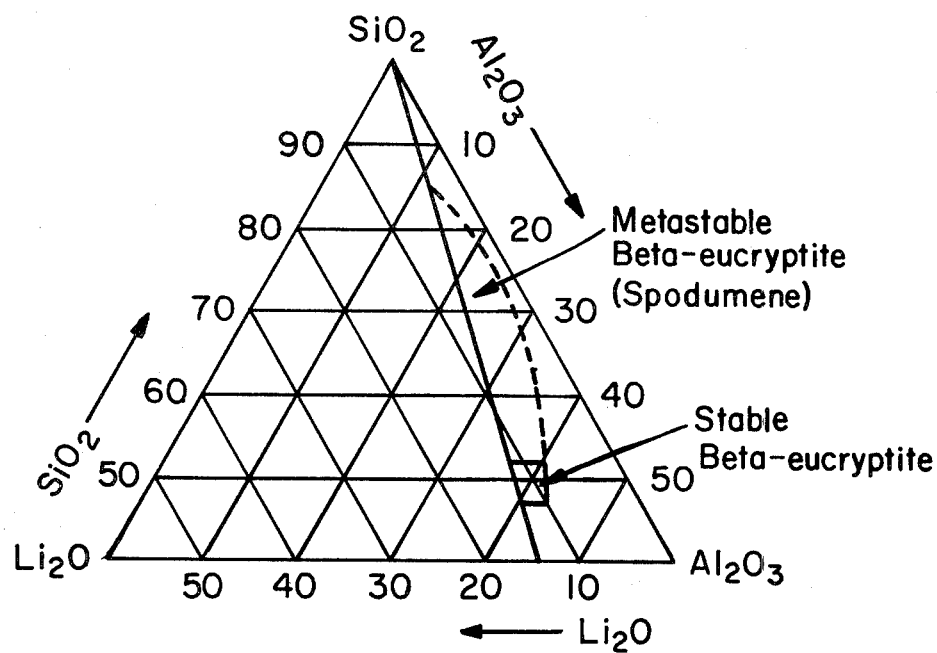

3,573,075
GLASS-CERAMIC ARTICLE AND METHOD
Bruce R. Karstetter, Painted Post, N.Y., assignor to Corning Glass Works, Corning, N.Y.
Continuation-in-part of application Ser. No. 365,035, May 5, 1964. This application May 31, 1968, Ser. No. 733,300
Int. Cl. C03c 3/22
U.S. Cl. 106—39
6 Claims

ABSTRACT OF THE DISCLOSURE

This invention relates to the strengthening of glass-ceramic articles wherein the crystal content thereof comprises the predominant portion and containing thermally stable beta-eucryptite as the principal crystal phase. The strengthening is accomplished through an ion exchange reaction taking place within a surface layer of the glass-ceramic article wherein sodium ions from an external source are exchanged for lithium ions in the beta-eucryptite, but wherein the structural nature of the crystals is essentially unchanged, to cause the development of an integral surface compression layer on the article.

---

This application is a continuation-in-part of my pending application, Ser. No. 365,035, filed May 5, 1964, now abandoned.

The production of glass-ceramic articles involves three general steps: First, a glass-forming batch commonly containing a nucleating agent is melted; second, this melt is simultaneously cooled to a glass and an article of a desired geometry shaped therefrom; and, Third, the shaped glass article is subjected to a particular heat treating schedule which initially promotes the development of nuclei in the glass that act as sites for the growth of crystals thereon as the heat treatment is continued.

This crystallization in situ of the glass article, resulting from the essentially simultaneous growth of the crystals on innumerable nuclei, lends a structure to the glass-ceramic article which consists of relatively uniformly-sized, fine-grained crystals homogeneously dispersed in a residual glassy matrix, the crystals comprising the predominant portion of the article. Thus, glass-ceramic articles are commonly defined as being greater than 50% by weight crystalline and, frequently, are actually over 90% by weight crystalline. This very high crystallinity has the further result of yielding a product exhibiting chemical and physical properties that are commonly very different from those of the parent glass and which are more nearly like those exhibited by a crystalline article. Finally, the high crystallinity of the glass-ceramic article cause the residual glassy matrix to have a very different composition from that of the parent glass since the components comprising the crystals will have been precipitated therefrom.

U.S. Pat. No. 2,920,971 provides an extensive discussion of the theoretical aspects and the practical considerations involved in the maufacture of glass-ceramic articles and reference is hereby made to that patent for background as to the structure and production of glass-ceramic articles. It can readily be appreciated that the crystal phases grown in glass-ceramic articles are directly related to the composition of the original glass and/or the heat treatment to which the article is exposed. Glass-ceramic articles having beta-eucryptite as the principal crystal phase and a method for manufacturing such articles are described in U.S. Pat. No. 3,279,931, filed Feb. 13, 1963 in the name of J. S. Olcott and assigned to a common assignee.

The term "beta-eucryptite" has been used to designate a crystal in the hexagonal system that has the formula $Li_2O \cdot Al_2O_3 \cdot 2SiO_2$ and is a high temperature form of alpha-eucryptite. In lithium-aluminum-silicate glas-ceramic materials, however, the crystal phase does not strictly conform to a naturally occurring crystal. Rather, it is more in the nature of a solid solution corresponding generally to the formula $Li_2O \cdot Al_2O_3 \cdot nSiO_2$ where "$n$" may vary from about 2 up to 7 or more depending on the silica content of the parent glass. There is also evidence to indicate that other ions, in particular the magnesium ion, may enter the crystal structure to some extent if present in the parent glass. However, the characteristic geometric pattern of the crystal, as shown by X-ray diffraction pattern analysis, invariably falls in either the hexagonal or tetragonal system. Accordingly, it has become customary, in identifying glass-ceramics, to essentially disregard stoichiometry and to term those lithium-aluminum-silicate crystal phases that are classifiable in the hexagonal system as bis-beta-eucryptite crystal phases, and those that are classifiable in the tetragonal system as beta-spodumene crystal phases. That practice is followed here.

Where the oxide stoichiometry in the crystal is such that the coefficient "$n$" is between 2 and about 3.5 in the formula $Li_2O \cdot Al_2O_3 \cdot nSiO_2$, a stable beta-eucryptite type crystal phase is normally observed. With larger proportions of silica ("$n$" greater than about 3.5), a beta-eucryptite type crystal of a metastable nature develops initially at temperatures of about 800° C. This transforms into a beta-spodumene type crystal when heat treated at still higher temperatures on the order of 900–1150° C.

The diffusion of ions in any medium is a direct function of the structure of the medium itself. Hence, whereas a crystal has a long range ordered structure of ions, glass has only short range order and has even been deemed to consist of a random network of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus, silica glass is thought to be composed of a random network of $SiO_4$ tetrahedra, all of whose corners are shared with one another. In silicate glasses containing modifying oxides (e.g. $Na_2O$, $K_2O$, $MgO$, $CaO$, $BaO$, etc.) some of the shared corners Si—O—Si bonds) are believed broken and oxygen ions are formed which are connected to only one silicon ion. The modifying ions remain in interstitial positions or structural vacancies. In modified aluminosilicate glasses, nonbridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cages is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally radom and there is no guarantee that certain structural vacancies or positions filled before exchange will be filled after exchange.

The concept of exchanging ions within a crystal structure has been appreciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitution in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion-exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

The modification of chemical composition and physical properties in the crystal phase of a glass-ceramic by ion exchange is generally disclosed and claimed in an application filed May 5, 1964, Ser. No. 365,117, in the name of R. O. Voss, entitled "Glass-Ceramic Article and Method," now abandoned, and assigned to a common assignee. This application specifically discloses that glass-ceramic materials containing a beta-spodumene crystal phase are capable of having the lithium ion of such crystal phase exchanged for a larger ion within a surface layer on the article to develop compressive stress within such surface layer and thereby greatly increase the mechanical strength of the article. It further discloses that this ion exchange strengthening, readily attainable with the beta-spodumene type crystal phase, is not obtained with the metastable beta-eucryptite crystal phase which forms preliminary to the beta-spodumene phase.

I have found that, in contrast to what might be expected from the findings reported in the Voss application, such strengthening can be obtained by ion exchage in glass-ceramic materials containing a stable beta-eucryptite crystal phase.

Based on this and other discoveries, the article of the present invention is a glass-ceramic article with a thermally stable beta-eucryptite crystal phase containing an exchangeable lithium ion, and characterized by a compressively stressed surface layer that contains a cation of larger ionic diameter, the surface layer differing in chemical composition from the interior of the article in that the lithium ion content of the surface layer is lower than that of the interior and the content of the larger cation in the surface layer is correspondingly larger. The invention further comprehends a method of increasing the mechanical strength of a glass-ceramic article characterized by a stable beta-eucryptite crystal phase which comprises exchanging a larger exchangeable cation for the lithium ion in a portion of the crystal phase within a surface layer on the article.

An exchangeable cation is a positively charged ion, e.g. a sodium ion, that can migrate to a finite depth in a material in exchange for another such ion under the combined activation of a chemical force (differential ion concentration) and a physical force (heat and/or electrical potential).

The present invention is not concerned with the manner in which the glass-ceramic article or its parent glass article are originally formed. It relates generically to articles formed from a glass-ceramic material containing a stable beta eucryptite crystal phase regardless of the particular composition, or method of formation, of the material.

It has been found, however, that the stable type of crystal which characterizes the article of the present invention is normally formed within a limited composition area. This area is illustrated in the accompanying drawing wherein the single figure is a conventional ternary composition diagram based on the oxides silica ($SiO_2$), alumina ($Al_2O_3$), and lithia ($Li_2O$) as indicated at the vertices of the diagram. The somewhat slanting vertical line from the silica vertex to the base of the diagram defines a composition line along which the molecular ratio of lithia to alumina is constant at a 1:1 ratio. The area enclosed by a solid line adjoining and to the right of this line represents a family of glass compositions in the indicated ternary oxide system which, when properly nucleated and heat treated, will produce glass-ceramics having a stable beta-eucryptic phase. In addition to the indicated oxides in the indicated ranges the compositions will normally include a suitable nucleating agent, e.g. $TiO_2$, $ZrO_2$, or a mixture of these oxides, and may contain minor amounts of other compatible glass-forming oxides. In general, the latter tend to dilute the glass-ceramic material and/or interfere with its strengthening potential. Therefore, they are avoided except as required for such essential purposes as melting of the glass, improving chemical durability, and the like.

By way of illustration then, a glass article of desired form is produced from a melt of selected composition. The article is then heat treated in a suitable manner to convert the glass to a glass-ceramic state by development of a crystalline phase.

Essentially, this heat treatment involves two steps or phases. First, the glass is nucleated by holding at a temperature within a range of about 700–800° C., or by heating sufficiently slowly through such range to accomplish nuclei formation. The nucleated glass is then heated to a crystallizing or ceramming temperature at which the crystalline phase separates out. This generally occurs at temperatures of about 900° C. and above. Since the beta-eucryptite crystal phase formed is stable, the temperature is limited only by crystal melting, not by conversion to a spodumene type crystal.

A glass-ceramic article in accordance with the present invention may be produced by bringing the article thus formed into conatct with a material containing a larger exchangeable cation at an elevated temperature and for a sufficient time to permit an effective degree of ion exchange, that is an exchange to a finite depth.

The larger exchangeable ion may be brought into intimate contact with the glass-ceramic article surface in various ways. However, it is generally convenient to employ a molten salt bath and to immerse the article in such bath for a predetermined time adapted to provide a desired degree of ion exchange. The exchange may occur very slowly at temperatures as low as 200° C. However, higher temperatures on the order of 500–600° C. are customarily employed to provide an effective degree of ion exchange within a period of time less than an hour.

The ion exchange process appears to be a diffusion controlled process such that the amount of exchange increases with the square root of time. While the rates of exchange increase with temperature, it is, of course, necessary to stay below a temperature at which the crystal structure disappears. As a practical matter, the ion exchange temperature is usually determined by the availability of suitable molten salt materials, or other ion exchange media; also, the increased tendency of such molten materials to chemically attack either the glass-ceramic material or the treating equipment as the temperature is increased.

It has been found that an optimum degree of exchange for strengthening purposes occurs within a limited time depending primarily on temperature. The following examples indicate this to be equivalent to about 10–20 minutes at temperatures of 580–590° C. While further exchange appears to occur with extended treatment, no substantial increase in strength occurs. Accordingly, an optimum treating schedule may readily be determined for any given application.

The exchange occurs between the exchangeable cation of the contacting material, normally a sodium ion from a sodium salt bath, and the lithium ion in the beta-eucryptite crystal. Evidence indicates the degree of exchange in a thermally activated ion exchange to be maximum at the very surface of the article and to decrease in a gradient manner inwardly into the layer. X-ray diffraction evidence indicates the original beta-eucryptite structure is retained, but that an expansive distortion occurs in the crystal cell on ion exchange. This is manifested by a slight shifting of the characteristic peaks in the diffraction pattern of the beta-eucryptite crystal phase.

By way of further illustrating, but not limiting, my invention, a detailed description of its practice in specific but typical embodiments thereof is set forth.

Table I illustrates glass forming batches from each of which was melted a glass that could be converted to a glass-ceramic having a stable beta-eucryptite crystal phase. The batches are set forth initially in terms of actual raw materials in parts by weight, and thereafter in terms of the corresponding oxides in proportions by weight as calculated with appropriate conversion factors. The average thermal coefficient of expansion (Exp.) of the resulting glass ($\times 10^{-7}$ and between zero and 300° C. is also shown.

TABLE I

| Materials: | 1 | 2 | 3 |
|---|---|---|---|
| Petalite | 622.8 | 586.1 | 512.1 |
| Alumina hydrate | 324.1 | 353.6 | |
| $Li_2CO_3$ | 142.0 | 169.9 | 127.6 |
| Titania | 50.0 | 50.0 | 50.4 |
| Calcined alumina | 63.4 | 69.3 | 270.9 |
| Barium carbonate | | | 157.5 |
| $SiO_2$ | 48.5 | 45.6 | 39.8 |
| $Al_2O_3$ | 38.0 | 39.9 | 35.7 |
| $Li_2O$ | 8.5 | 9.5 | 7.5 |
| $TiO_2$ | 5.0 | 5.0 | 5.0 |
| $BaO$ | | | 12.0 |
| Exp. | 61. | 66. | |

Each batch was melted to a clear, homogeneous glass and worked into various forms including quarter inch diameter canes. The latter were cut into four inch lengths suitable for strength testing and then converted to the glass-ceramic state by various heat treatments.

Sets of the glass-ceramic cane samples were then subjected to ion exchange treatment at temperatures of 580–590° C. for ten or twenty minute periods of time. The treatment consisted of immersing a set of cane samples for a period of time in a molten salt bath of 85% $NaNO_3$ and 15% $Na_2SO_4$ operating at a constant temperature.

After removal from the bath and cleaning, each ion exchanged cane sample was subjected to a severe form of surface abrasion wherein cane samples were mixed with 200 cc. of 30 grit silicon carbide particles and subjected to a tumbling motion for 15 minutes in a Number 0 ball mill jar rotating at 90–100 r.p.m. Each abraded cane sample was then mounted on spaced knife edges in a Tinius Olsen Testing Machine and a continuously increasing load applied opposite to and intermediate of the supports until the cane broke in flexure. From the measured load required to break each cane, a modulus of rupture (MOR) value was calculated for the individual cane and an average value determined for each set of samples. This value is taken as the tumble abraded strength of the sample.

Inasmuch as the strength of these glass-ceramic articles is directly related to the integral surface compression layer developed thereon by means of the ion exchange reaction and, since essentially all service applications for these articles will result in surface injury thereto even if only that sustained in conventional handling and shipping, the permanent or practical strength exhibited by the article is that which is maintained after substantial surface abrasion. Therefore, the above-described tumble abrasion test was devised to simulate the surface abuse which glass-ceramic articles might reasonably be expected to incur in field service. The depth of the surface compression layer is, preferably, at least about 0.001" to attain satisfactory abraded strength in the article. Electron microscope examination of a cross-section of the article can determine this depth.

The following summary shows in outline form the maximum temperature to which each set of samples was heated in its particular ceramming tretament, the coefficient of expansion of the resulting glass-ceramic material, the time and temperature of ion exchange, and the average MOR of the ion exchange strengthened and tumble abraded glass-ceramic cane samples produced by the indicated treatment. All temperatures are in ° C. and times in minutes. In each case, the predominant crystal phase was beta-eucryptite as shown by X-ray diffraction pattern analysis.

| Glass: | Ceramming temperature | Ion exchange | | | MOR (×10⁻³) |
|---|---|---|---|---|---|
| | | Exp. | Time | Temp. | |
| 1 | 720 | 3.9 | 20 | 580 | 38.7 |
| 1 | 830 | 1.6 | 20 | 580 | 27.2 |
| 1 | 1,060 | 1.5 | 10 | 580 | 34.6 |
| 1 | ¹ 1,060 | 2.0 | 10 | 580 | 32.9 |
| 1 | 1,100 | 2.3 | 20 | 580 | 32.0 |
| 2 | 700 | 5.6 | 10 | 590 | 29.5 |
| 2 | 835 | 6.6 | 20 | 590 | 33.3 |
| 2 | 1,100 | 6.7 | 20 | 590 | 38.5 |
| 2 | 1,195 | 6.3 | 10 | 590 | 27.4 |

¹ 60 min. hold.

For purposes of comparison, untreated glass-ceramic cane from each glass, which were abraded in similar manner, exhibited average MOR's of 8,000–9,000 p.s.i.

Glass 3 was cerammed on this schedule: Heat 300° C./hr. to 695° C.; hold 1 hour; heat 10° C./hr. to 705° C.; heat 300° C./hr. to 1120° C.; hold 40 minutes; heat 10° C./hr. to 1170° C.; hold 30 minutes; cool.

Cane samples were immersed in the 85% $NaNO_3$–15% $Na_2SO_4$ salt bath for ten (10) minutes at 580° C., cleaned, abraded and tested as above. The average MOR for these samples was 25,000 p.s.i. as compared to an average MOR of 13,500 for abraded, but untreated, glass-ceramic cane samples.

The structure of the crystallized cane of each example was studied by means of X-ray diffraction analysis and replica electron micrographs. Each cane sample was measured to be greater than about 70% by weight crystalline with beta-eucryptite comprising the predominant crystal phase. In Examples 1 and 2, anatase was observed in amounts much less than about 5% by weight. Example 3 also contained a very minor amount of anatase with between about 10–15% by weight of celsian.

Since, as was observed above, the glass-ceramic articles of this invention are highly crystalline, not only is the bulk of the residual glassy matrix very small but also the composition thereof is very different from that of the original glass. Hence, in the preferred embodiment of the invention, substantially all of the lithium ions will be incorporated in the crystal structure of the beta-eucryptite and any other crystal phase present, resulting in a residual glassy matrix composed primarily of silica. However, some lithium ions over and above those included in the crystal phase can be tolerated but amounts in excess of about 5% by weight frequently produce a coarse-grained rather than the desired fine-grained glass-ceramic article. It will, of course, be apparent that these "contaminant" lithium ions in the glassy matrix can also be exchanged with the sodium ions during the subsequent ion exchange process, but, it will be equally evident that inasmuch as the number of such ions is very small and the total amount of glass in the article is very small, the effect of such an exchange upon the properties of the article would be essentially negligible when compared with the exchange occurring within the beta-eucryptite crystals.

Whereas in the above-recited examples a bath of molten salt provided the source of sodium ions and such is surely the preferred practice for carrying out the ion exchange process, it can be appreciated that other media for sodium ions can be employed which can be useful at the operable temperatures of this invention. Hence, pastes and vapors are well-known sources for exchangeable ions in the ion exchange staining arts. Further, it will be evident that the most rapid rate of exchange and the highest strengths will commonly be achieved where pure sodium ion-containing materials are utilized as the exchange medium although some contamination can be tolerated. Nevertheless, the determination of the maximum amount of contamination that can be tolerated in the ion exchange medium and still yield a satisfactorily strong article is believed to be well within the technical ingenuity of a person of ordinary skill in the art.

My invention is based upon the replacement of lithium ions in the crystal structure of beta-eucryptite with sodium ions. That this exchange does, indeed, take place can be demonstrated through chemical analysis of powdered exchanged samples. X-ray diffraction analysis of the surface crystals prior to and subsequent to the ion exchange process indicates retention of the basic $\beta$-eucryptite structure with some expansive distortion. This substitution of sodium ions for lithium ions in the crystal structure can be seen in the following table which records several of the $d$-spacings and the intensities observed thereat in an X-ray diffraction pattern obtained of the surface crystallization of Example 1 cerammed at 1100° C. before and after the exchange of ions. The intensities observed are arbitrarily recorded as very strong (vs), strong (s), moderate (m), and weak (w).

| Before exchange | | 85% $NaNO_3$–15% $Na_2SO_4$ 20 minutes at 580° C. | |
|---|---|---|---|
| d | I | d | I |
| 4.57 | s | 4.60 | m |
| 3.88 | w | 3.90 | w |
| 3.51 | vs | 3.51 | vs |
| 2.63 | m | 2.65 | m |
| 2.28 | m | 2.29 | m |
| 2.10 | m | 2.11 | m |
| 1.89 | vs | 1.90 | vs |
| 1.80 | w | 1.80 | w |
| 1.75 | w | 1.75 | w |
| 1.72 | w | 1.73 | w |
| 1.69 | w | 1.69 | w |
| 1.64 | s | 1.65 | s |

It is believed that the table amply demonstrates the retention of the basic beta-eucryptite crystal structure throughout the ion exchange process, since the peaks in the diffraction pattern which are characteristic of the beta-eucryptite crystals before the ion exchange are present after the exchange but the $d$-spacings and intensities thereat vary somewhat, thereby reflecting a distortion and expansion of the crystal cell but not the destruction thereof resulting from the crowding of sodium ions into the sites within the crystals originally occupied by lithium ions.

Finally, since the lithium ions in these highly crystalline glass-ceramic articles are virtually absent from the residual glassy matrix, the integral surface compression layer developed within the articles must necessarily be the result of ion exchange within the crystals of this surface layer. Although, as has been pointed out above, beta-eucryptite comprises the predominant crystal phase, minor amounts of other crystals can also be present. However, inasmuch as the existence of such incidental crystals can dilute the maximum strengthening effect which can be achieved when beta-eucryptite constitutes the only crystal phase, it is much preferred to restrict the sum of all such extraneous crystallization to less than about 20% of the total thereof.

While some experimentation will be necessary to determine optimum treating conditions for any given composition, the above data is exemplary of satisfactory ceramming and ion exchange strengthening schedules for stable beta-eucryptite glass-ceramics generally. It is readily seen that the invention provides an effective abraded strength increase of about 2–4 fold in this type of material which is of particular value because of its low thermal expansion coefficient.

I claim:
1. A unitary glass-ceramic article of high strength with an integral surface compressive stress layer and an interior portion and having a crystal content of at least 70% by weight of the article, wherein the crystals of said interior portion consist essentially of thermally stable beta-eucryptite and the crystals of said surface compressive stress layer consist essentially of thermally stable beta-eucryptite, the structural nature of said latter beta- eucryptite crystals being essentially unchanged but in at least a portion of which the molar concentration of lithium is less with a corresponding increase in the molar concentration of sodium ions.

2. A glass-ceramic article according to claim 1 wherein said interior portion consists essentially of $Li_2O$, $Al_2O_3$, and $SiO_2$ in the proportions denominated stable beta-eucryptite set forth in the ternary composition diagram comprising the single figure.

3. A method for making a unitary glass-ceramic article of high strength wherein the crystal content thereof constitutes at least 70% by weight of the article and having an integral surface compressive stress layer and an interior portion which comprises contacting a glass-ceramic article consisting essentially of $LiO_2$, $Al_2O_3$, $SiO_2$, $TiO_2$ and/or $ZrO_2$ and consisting essentially of beta-eucryptite as the crystal phase at a temperature between about 200°–600° C. with a source of exchangeable sodium ions for a period of time sufficient to replace at least part of the lithium ions of said beta-eucryptite in a surface layer of the article with sodium ions, said replacement not changing the essential structural nature of the beta-eucryptite crystals but thereby effecting an integral compressively stressed surface layer on the article.

4. A method according to claim 3 wherein said interior portion consists essentially of $Li_2O$, $Al_2O_3$, and $SiO_2$ in the proportion denominated stable eucyptite set forth in the ternary composition diagram comprising the single figure.

5. A method according to claim 3 wherein said glass-ceramic article is contacted with a source of exchangeable sodium ions at a temperature between about 500°–600° C.

6. A method according to claim 5 wherein said glass-ceramic article is contacted with a source of exchangeable sodium ions for about 10–60 minutes.

References Cited

UNITED STATES PATENTS

| | | | |
|---|---|---|---|
| 2,779,136 | 1/1957 | Hood et al. | 65—30X |
| 3,218,220 | 11/1965 | Weber | 65—30X |
| 3,282,770 | 11/1965 | Stookey et al. | 65—30X |
| 3,482,513 | 2/1969 | Denman | 65—33X |

OTHER REFERENCES

Kistler, S. S.: "Stresses in Glass Produced by Non-Uniform Exchange of Monovalent Ions," J. of Am. Cer. Soc., vol. 45, No. 2, pp. 59–68, February 1962.

S. LEON BASHORE, Primary Examiner

J. H. HARMAN, Assistant Examiner

U.S. Cl. X.R.

65—30, 33